Sept. 14, 1948.                H. O. DAY                  2,449,202
              HYDRAULIC ACTUATING MECHANISM FOR DUMP TRUCKS
Filed Nov. 8, 1946                                    3 Sheets-Sheet 1
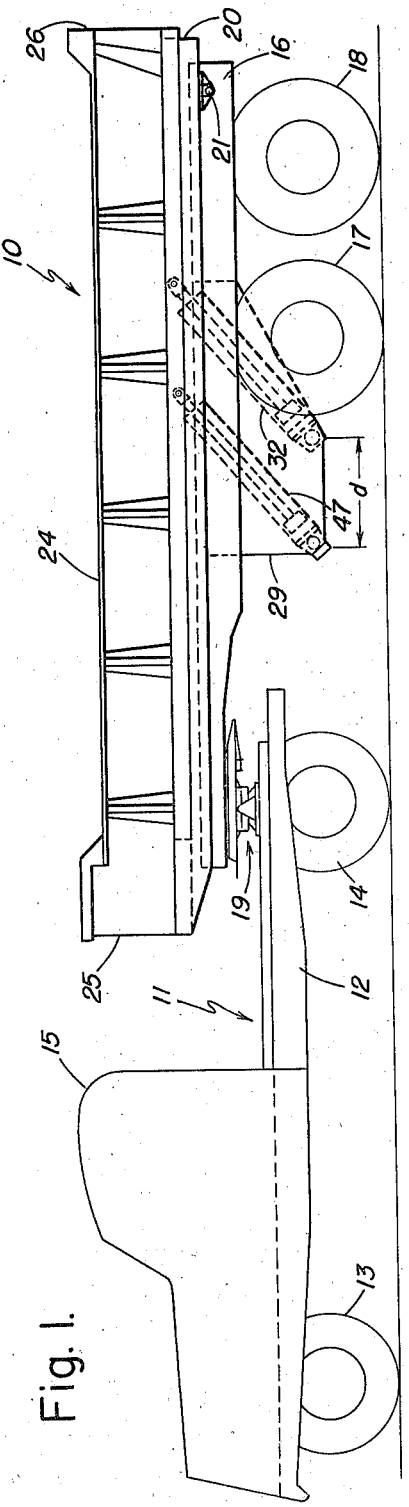
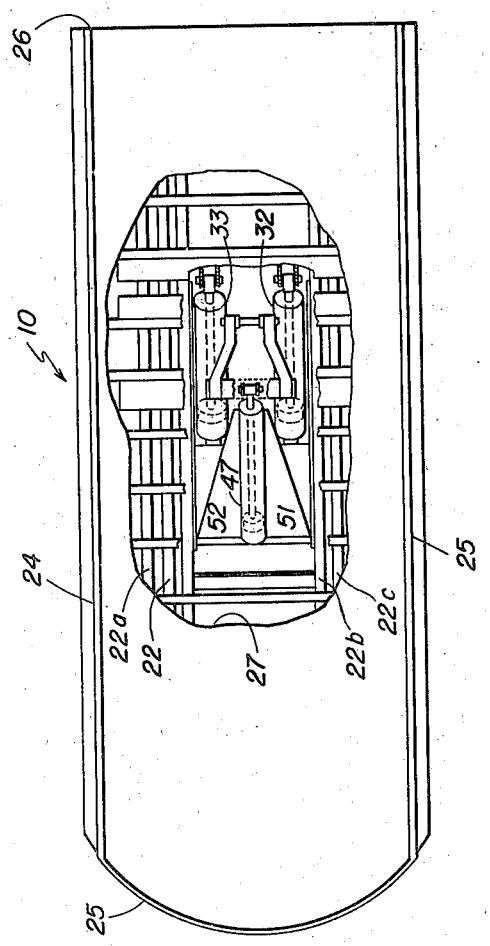
INVENTOR:
Herbert O. Day
BY Sept. 14, 1948.  H. O. DAY  2,449,202
HYDRAULIC ACTUATING MECHANISM FOR DUMP TRUCKS
Filed Nov. 8, 1946  3 Sheets-Sheet 2

INVENTOR:
Herbert O. Day
BY
Arthur Middleton
Atty.

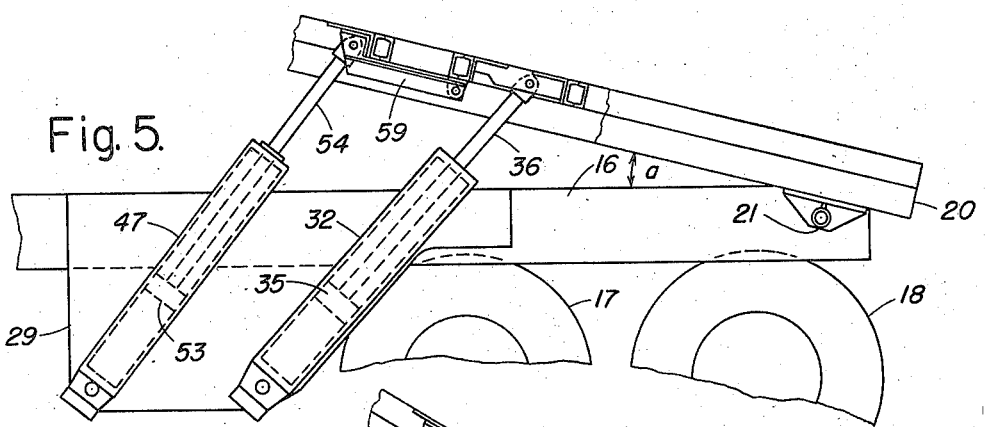
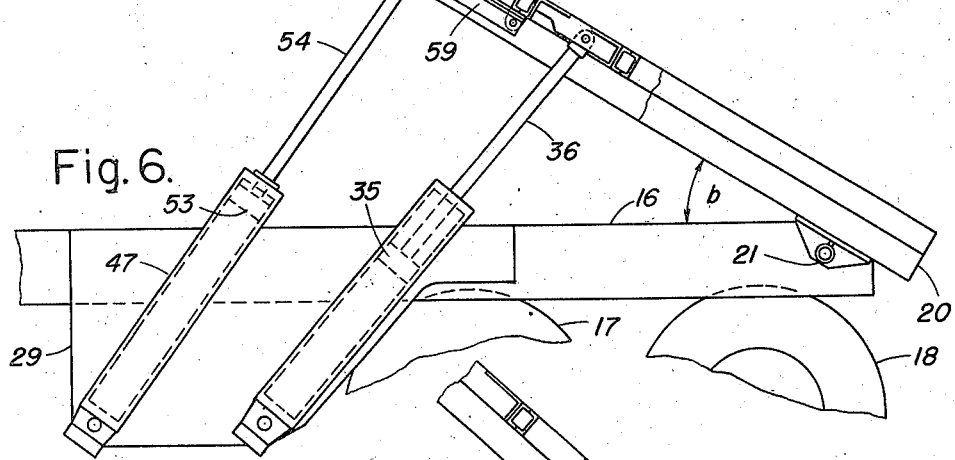
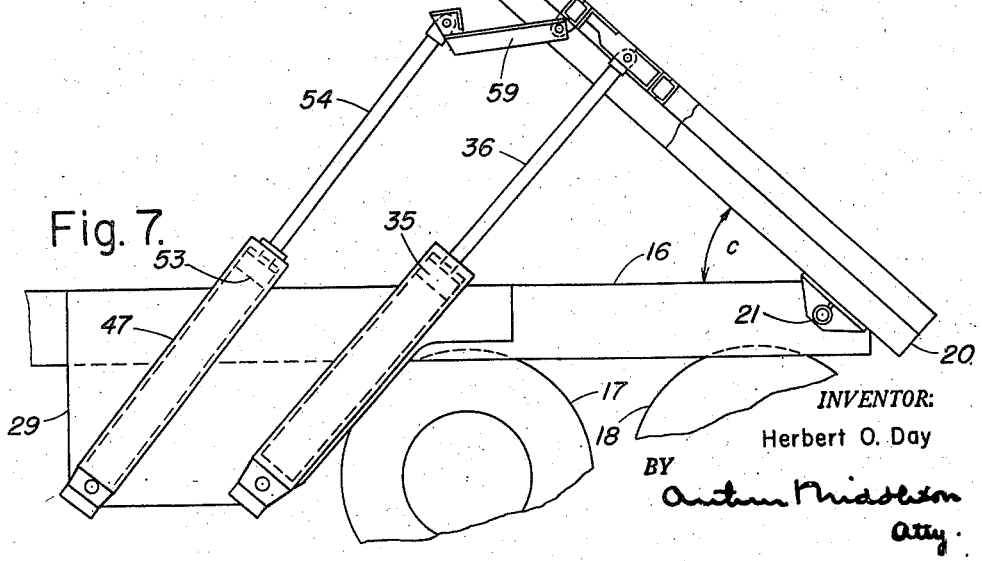

Patented Sept. 14, 1948

2,449,202

UNITED STATES PATENT OFFICE 2,449,202

HYDRAULIC ACTUATING MECHANISM FOR DUMP TRUCKS

Herbert O. Day, Bowling Green, Ohio

Application November 8, 1946, Serial No. 708,632

3 Claims. (Cl. 298—22)

This invention relates to load dumping mechanism in vehicles and more specifically to actuating mechanism for the tiltable vehicle body of motor trucks. Further particularized this relates to an improved arrangement of hydraulic actuating cylinders in such actuating mechanism in which the hydraulic power is furnished by a hydraulic pump which is driven from the truck engine.

One of the problems in the construction of such actuating mechanism is to provide effective and favorable force leverages or moments, or to derive from the power cylinders a maximum force component for the tilting of the loaded truck body from its initial horizontal position. That position is difficult for the lifting forces to apply since the space available for such mechanism underneath the truck body and between it and the chassis is crowded.

Other problems lie in the contradictory requirements that a maximum of length of movement of the truck body should be attained with a relative minimum of cylinder length, of piston rod length, and of piston travel. Another problem is how to minimize mechanical stresses upon the force-sustaining parts and operating members.

Structural and functional problems to be met in the construction of such mechanism may be said to reside in obtaining favorable force leverages in a compact space, minimizing the extent of piston rod length in view of guidance required for and compression stresses imposed upon the piston rod of the hydraulic cylinder, minimizing cylinder diameter and cylinder wall thicknesses while deriving maximum effective lifting forces, reducing mechanical stresses upon the mechanism and associated parts as well as reducing their weight, reducing the peak torque or peak power requirements or peak hydraulic pressures required for lifting the load of the truck body, and to derive from the operation of the mechanism load-lifting effects or tilting moments which vary in a desired manner with the angular position of the tilting truck body.

It is among the objects of this invention to provide hydraulically operated actuating mechanism capable of meeting one or more of the foregoing problems.

To this end I provide an arrangement of hydraulic power cylinders in which the resultant point of force application varies automatically in a desired manner during the tilting movement of the body.

Structurally speaking I provide a plurality of functionally associated power cylinders disposed and controlled in a manner whereby their respective duties or loads are varied automatically in a desired manner in accordance with the progress and requirements of the tilting movement. That is to say I allow an auxiliary or booster cylinder to apply an auxiliary force at a relatively favorable point of the truck body during the initial phase of its lifting movement, in addition to the less favorably applied force of a main cylinder. The booster lifting force is effective until the body has reached an angular position at which the main cylinder force is being applied more effectively than in the initial horizontal position.

According to one feature I provide a main cylinder and behind it an auxiliary cylinder, both inclined towards the tilting axis of the body, the main cylinder being closer to the tilting axis than the auxiliary cylinder, so that their respective lifting forces are applied at successive points along the truck body. At the beginning of the body-tilting movement both cylinders apply their combined lifting power to the body as the auxiliary piston rod extends faster than the main piston rod. At an intermediate point of the tilting movement, namely at the end of travel of the auxiliary piston rod, that rod functionally detaches itself from the truck body as a link between it and the body becomes effective to maintain a predetermined relationship between them, thus leaving it to the main cylinder alone to complete the tilting movement of the body for the purpose of dumping the load.

In one embodiment I provide a pair of main cylinders, one at each side of the chassis and a single auxiliary cylinder centrally disposed behind them.

It is among the advantages of this invention that because of the addition of the auxiliary support derived from the auxiliary cylinder, the length of the free overhanging portion of the truck body is shortened, with the result that the bending stresses upon the truck body are relatively diminished so that a lighter body structure may suffice.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which Fig. 1 illustrates the invention as embodied in a trailer hitched to a truck;

Fig. 2 is a plan view of the trailer with parts broken away to disclose the lifting mechanism;

Figs. 3, 5, 6 and 7 illustrate the function and co-action of the hydraulic cylinders, that is the co-action of the main cylinders with the auxiliary or booster cylinder, in a sequence of tilting phases or angular positions of the body;

Fig. 3 shows the starting phase when the body is in its initial horizontal position with all piston rods of the cylinder fully retracted;

Fig. 5 shows the main and auxiliary piston rods partially extended and the box body in a slightly raised position;

Fig. 6 shows the auxiliary piston rod fully extended, the main piston rod in a corresponding partially extended condition, and the box body in a correspondingly higher raised although still intermediate position;

Fig. 7 shows the main as well as the auxiliary piston rod fully extended although with the auxiliary piston rod operatively detached from the box body and the box body thus fully raised.

Figure 3:
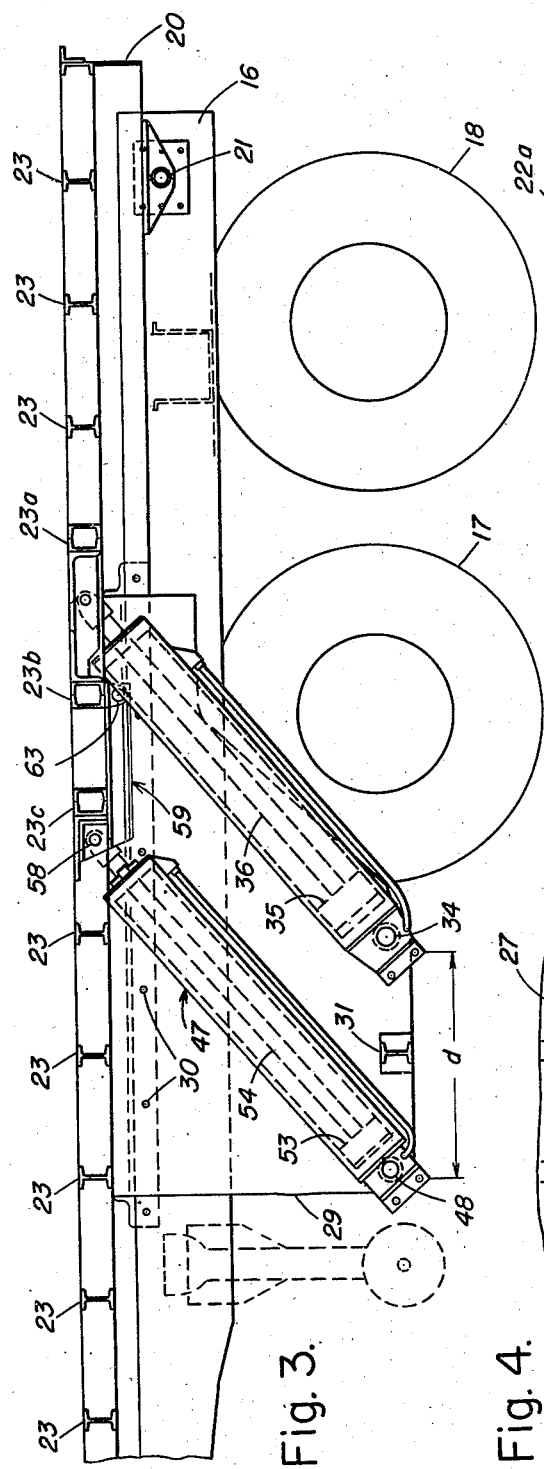

In order to raise the body 10 from its Fig. 3 lower or rest position hydraulic pressure fluid is admitted to the bottoms of all cylinders, that is the main as well as the auxiliary cylinders, forcing all piston rods to extend and to co-act in raising the body from its initial horizontal position. During this initial lifting phase as indicated by the angle $a$ in Fig. 5 the force exerted by the piston rod 54 of the auxiliary or booster cylinder is being applied at a point of the body more favorable than the forces exerted by the piston rods of the main cylinders 32 and 33, even though all co-act in exerting a combined powerful initial lifting moment upon the body. When the auxiliary piston rod 54 will have fully extended to its Fig. 6 position the body will have reached a steeper tilting angle $b$ while the piston rods of the main cylinders 32 and 33 will have reached an intermediate point of extension at which the forces exerted by them act upon the body under a more favorable load lifting angle than they did in their initial (Fig. 3) position. As the outward movement or extension of the two main piston rods continues as a result of continued hydraulic pressure, the auxiliary piston rod 54 having reached its terminal (Fig. 6) position will functionally detach itself from the body 10 when subsequently (see Fig. 7) the link member 59 becomes effective in allowing the main piston rods alone to complete the tilting or dumping movement of the body.

The end tilting position of the body is indicated in Fig. 7 showing the pistons of all cylinders as having reached the outer end of their travel, and the body being tilted at an angle $c$.

The invention is herein shown to be embodied in trailer 10 hitched to a truck 11 indicated by a chassis frame 12 on wheels 13 and 14, and a driver's cab 15.

Figure 4:
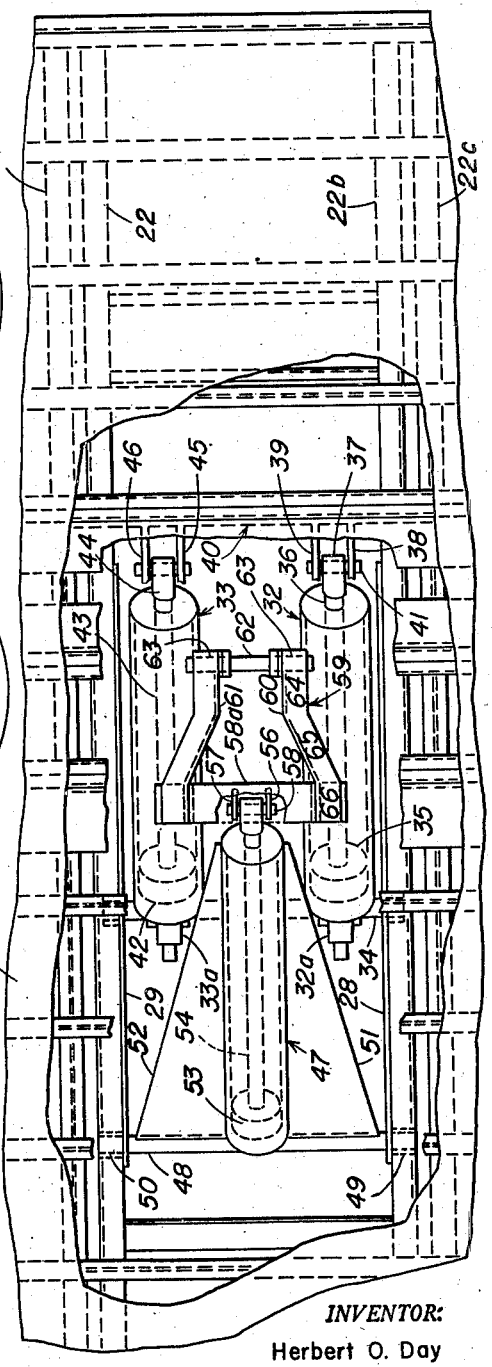
Fig. 4 is a plan view of Fig. 3 with a bottom portion of the box body broken away to disclose the power cylinder arrangement underneath.

The trailer 10 comprises a frame 16 the rear end of which is supported by wheels 17 and 18 while the front end is supported upon the chassis frame of the truck by means of a turntable construction 19 in a customary manner. Upon the frame 16 is mounted a load-receiving box body 20 swingable or tiltable about a horizontal axis at the rear end of the frame, namely about a shaft or pivot 21. The frame is indicated by longitudinal beams or stringers 22 and 22ª and 22ᵇ and 22ᶜ and transverse members 23 and another kind of transverse members 23ª, 23ᵇ, and 23ᶜ. The box body is shown to comprise sides 24, ends 25 and 26, and a bottom 27 (see Fig. 4).

The body- and load-lifting mechanism is attached to the under side of the frame 16 and comprises a pair of parallel side plates or shields 28 and 29 having their upper horizontal edge portions fastened to respective stringers 22 and 22ᵇ as by bolts 30 and their lower ends rigidly interconnected as by a transverse beam 31.

Between the shields 28 and 29 and carried thereby are a pair of main hydraulic power cylinders 32 and 33, their bottom ends 32ª and 33ª respectively being mounted upon a shaft 34 carried by and extending between the shields 28 and 29, so that the cylinders are swingable about a horizontal axis. The cylinder 32 has a piston 35 and a piston rod 36 the outer end 37 of which lodges between ribs 38 and 39 of a bracket member 40 and is pivotally connected thereto as at 41.

The other main cylinder 33 has a piston 42 and a piston rod 43 the outer end 44 of which lodges between ribs 45 and 46 also constituting part of the bracket member 40 which in turn is disposed between and fastened to the transverse members 23ª and 23ᵇ of the body 10.

A single auxiliary hydraulic power cylinder 47 is disposed centrally with respect to the two main cylinders although spaced therefrom a distance $d$ towards the front end of the trailer.

The cylinder 47 is also swingably mounted since its bottom end is unitary with a transverse shaft 48 the ends of which are journalled as at 49 and 50 upon the respective vertical shields 28 and 29. A pair of symmetrically disposed reinforcing ribs or stiffeners 51 and 52 extend the length of the cylinder at each respective side thereof and rigidly connect the cylinder with the shaft 48 in a manner more clearly shown in my co-pending patent application No. 688,386.

The auxiliary cylinder 47 has a piston 53 and a piston rod 54 the free end of which lodges between ribs 56 and 57 with which it is pivotally connected as at 58. The ribs 56 and 57 constitute part of a transverse member 58ª which in turn constitutes a portion of a swingable or link member 59 comprising a pair of symmetrically disposed arms 60 and 61 rigidly interconnected at one end by the transverse member 58ª and at the opposite end by a transverse shaft 62 journalled as at 63 upon the under side of the transverse member 23ᶜ. Each of the arms 60 and 61 has a longitudinal end portion 64, a diagonally extending portion 65, and a longitudinal portion 66.

I claim:

1. Load-dumping mechanism for a vehicle having a chassis frame, and a truck body tiltable upon said chassis about a horizontal axis extending transversely of the chassis frame, said mechanism comprising a main hydraulic power cylinder the rear end of which is mounted upon said chassis frame to swing about a horizontal axis representing the pivotal point of the cylinder and which has a piston rod engaging the truck body, an auxiliary cylinder spaced from said main cylinder and having its rear end pivotally mounted upon said chassis frame at a point spaced farther from said horizontal body-tilting axis than the pivotal point of said main power cylinder so as to swing about a horizontal axis parallel to said other two horizontal axes and having an auxiliary piston rod engaging said truck body, and automatic means for operatively disengaging the auxiliary piston rod from the body when the body continues tilting past the maximum extension of the auxiliary piston rod, and for operatively reconnecting said piston end with the body at a pre-determined point of the return movement thereof.

2. Load-dumping mechanism according to claim 1, in which said automatic means comprise a link member connecting the end portion of the auxiliary piston rod with the truck body which member is disposed in the plane of movement of the auxiliary cylinder.

3. Load-dumping mechanism according to claim 1, in which one main cylinder is disposed at each side of the chassis frame, one single auxiliary cylinder is disposed centrally of the chassis frame, and in which the said automatic means comprise a link member connecting the end portion of the auxiliary piston rod with the truck body which member is disposed in the plane of movement of the auxiliary cylinder.

HERBERT O. DAY.

REFERENCES CITED

The following references are of record in the file of this patent:

UNITED STATES PATENTS

| Number | Name | Date |
|---|---|---|
| 1,638,009 | Cambessedes | Aug. 9, 1927 |
| 2,326,594 | Wood | Aug. 10, 1943 |